United States Patent
Bryant

Patent Number: 6,091,132
Date of Patent: *Jul. 18, 2000

[54] PASSIVATION FOR INTEGRATED CIRCUIT SENSORS

[75] Inventor: Frank R. Bryant, Denton, Tex.

[73] Assignee: STMicroelectronics, Inc., Carrollton, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/995,211

[22] Filed: Dec. 19, 1997

[51] Int. Cl.$^7$ .................................................. H01L 23/58
[52] U.S. Cl. ........................... 257/632; 257/640; 438/703
[58] Field of Search ...................... 257/632, 635, 257/640, 642; 438/763

[56] References Cited

U.S. PATENT DOCUMENTS

| | | | |
|---|---|---|---|
| 4,353,056 | 10/1982 | Tsikos | 340/146.3 |
| 4,394,773 | 7/1983 | Ruell | 382/4 |
| 4,428,670 | 1/1984 | Ruell et al. | 356/71 |
| 4,429,413 | 1/1984 | Edwards | 382/4 |
| 4,577,345 | 3/1986 | Abramov | 382/4 |
| 5,563,102 | 10/1996 | Michael | 438/614 |
| 5,578,867 | 11/1996 | Argos, Jr. et al. | 257/632 |
| 5,659,626 | 8/1997 | Ort | 382/125 |
| 5,828,773 | 10/1998 | Setlak et al. | 382/126 |

FOREIGN PATENT DOCUMENTS

| | | | |
|---|---|---|---|
| 4323854 | 11/1992 | Japan | 257/643 |

OTHER PUBLICATIONS

Silicon Fingerprint Sensor Offers Cost–effective Biometric Solution for Security, Press Release, Nov. 1997.

TouchChip™ Silicon Fingerprint Sensor, Press Release, Nov. 1997.

FP12.3: A 390dpi Live Fingerprint Imager Based on Feedback Capacitive Sensing Scheme, ISSCC97/Session 12/Sensors/Paper FP 12.3, Feb. 1997.

SGS Thompson Develops First Microchip That Records Fingerprints Electronically On Contact, Press Release, May 1997.

*Primary Examiner*—Mark V. Prenty
*Attorney, Agent, or Firm*—Theodore E. Galanthay; Lisa K. Jorgenson; Dan Venglarik

[57] ABSTRACT

A structure and method for creating an integrated circuit passivation comprising, a circuit (16) over which an insulating layer (26 and/or 28) is disposed that electrically and hermetically isolates the circuit (16) and a silicon carbide layer (30) to form a passivation (24) to protect a circuit (16), is disclosed.

10 Claims, 1 Drawing Sheet

PASSIVATION FOR INTEGRATED CIRCUIT SENSORS

CROSS REFERENCE TO A RELATED APPLICATION

The following related patent applications, each showing a type of electrostatic discharge protection method and apparatus, are incorporated herein by reference and with which the present invention finds utility: U.S. patent application Ser. No. 08/927,450, STMicroelectronics Docket No. 97-B-037, filed Sep. 11, 1997 and titled ELECTROSTATIC DISCHARGE PROTECTION OF A CAPACITIVE TYPE FINGERPRINT SENSING ARRAY; U.S. patent application Ser. No. 09/144,182, filed Aug. 31, 1998, and titled SELECTIVELY DOPED ELECTROSTATIC DISCHARGE LAYER FOR AN INTEGRATED CIRCUIT SENSOR; U.S. patent application Ser. No. 09/224,812, Attorney's Docket No. 119932-1042, STMicroelectronics Docket No. 97-C-179, filed on the same date herewith, and titled STATIC CHARGE DISSIPATION FOR AN ACTIVE CIRCUIT SURFACE; U.S. patent application Ser. No. 09/223,706, Attorney's Docket No. 119932-1038, STMicroelectronics Docket No. 98-B-085, filed on the same date herewith, and titled STATIC CHARGE DISSIPATION PADS FOR SENSORS; U.S. patent application Ser. No. 09/223,346, Attorney's Docket No. 119932-1039, STMicroelectronics Docket No. 98-B-087, filed on the same date herewith, and titled APPARATUS AND METHOD FOR CONTACTING A SENSOR CONDUCTIVE LAYER; U.S. patent application Ser. No. 09/224,815, Attorney's Docket No. 119932-1040, STMicroelectronics Docket No. 98-C-088, filed on the same date herewith, and titled APPARATUS AND METHOD FOR CONTACTING A CONDUCTIVE LAYER; U.S. patent application Ser. No. 09/223,707, Attorney's Docket No. 119932-1041, STMicroelectronics Docket No. 98-C-090, filed on the same date herewith, and titled TOPOGRAPHICAL ELECTROSTATIC PROTECTION GRID FOR SENSORS; and Attorney's Docket No. 119932-1037, STMicroelectronics Docket No. 98-B-82/86, filed on the same date herewith, and titled ELECTROSTATIC DISCHARGE PROTECTION FOR SENSORS U.S. patent application Ser. No. 09/223,629.

TECHNICAL FIELD OF THE INVENTION

The present invention relates in general to the field of the detection of patterns, and more particularly, to the use of integrated circuit sensors and a structure and method for protecting the same.

BACKGROUND OF THE INVENTION

Without limiting the scope of the invention, its background is described in connection with the protection of integrated circuit fingerprint sensors from the environment during regular use, as an example.

Heretofore, in this field, the detection of fingerprint patterns has been useful for the identification of specific individuals based on the observation that each individual person has a unique fingerprint. Fingerprints, therefore, can be used not only to positively identify individuals, but to exclude individuals whose fingerprint profile does not match a pre-existing set of patterns.

Fingerprint sensing has evolved from optical and mechanical sensing technology that acquires a fingerprint image. Generally, the mechanical and optical sensors obtained a fingerprint image using a scanner or a camera, processed the acquired information into an analog or digital signal that could be analyzed, and provided an output based on the acquired signal. Unfortunately, the lighting and contrast conditions available at the time the image was acquired affected the analysis and consequently the output from the sensor.

Another class of fingerprint sensors are capacitive sensors, such as that disclosed in U.S. Pat. No. 4,353,056 issued to Tsikos. The Tsikos patent demonstrates the use of a sensor that incorporates a sensing member that has a sensing surface for receiving a fingerprint. The sensing surface has a means for sensing the ridges and valleys of the skin of the finger under observation. A sensing member containing a multitude of capacitors that sense the patterns of the fingerprint when the finger is pressed against the sensing surface. The information obtained is transformed into an electric signal. The capacitors are insulated from the environment of use by a flexible membrane that conforms itself to the contour of the fingerprint. Unfortunately, the repeated cycles of flexing and compression of the flexible membrane can lead to device failure and the need to replace the membrane.

U.S. Pat. No. 4,353,056 issued to Ruell, et al., discloses a fingerprint sensor that provides an electric output signal in response to the topographic relief of the fingerprint. The sensor incorporates a contact body that is formed at least in part by a light transparent elastic material. The elastic contact material can be attached to a flat sensor plate that has a light receiving surface. The sensor also incorporates a light source and a photodetector to measure the valleys and ridges of the fingerprint. As with the sensor described hereinabove, the elastic nature of the contact body leads to cycles of compression and flexing that lead to the deterioration of the contact point between the sensor and the finger.

SUMMARY OF THE INVENTION

It has been found, however, that the present methods and structures for protecting fingerprint sensors from the environment of use fails to address the distinct environmental exposures to which the sensors are exposed. For example, under ideal conditions the user would gently place the finger on the plate without an excess of pressure or shock. Unfortunately, it is the case that the sensor surface will be exposed to a wide variety of pressures, but that objects other than fingers might come in contact with the sensor surface.

Another significant problem of current structures for the protection of fingerprint sensors are the contaminants, such as oils and proteins that are found on the surface of fingers. To remove these contaminants it will be the case that organic and inorganic solvents and detergents will be needed to clean the sensor surface.

Another area of concern is hygiene. Fingers, as well as the environment, tend to contain a number of microbes that need to be removed from the sensor along with finger contaminants. To remove these materials and reduce the chance of contagion between users, antibacterial, antifungal and decontaminating agents are used to clean the sensors. These decontaminating agents can often include harsh abrasives, enzymes, organic and inorganic solvents and detergents. Furthermore, the sensors are exposed to oxidating environments, UV rays, and the like during normal use.

What is needed is a structure and method to protect fingerprint sensors from mechanical stress. The structure must not only permit continued functioning of the sensor during normal use, but be able to withstand, among others, the extreme conditions of heat, light, oxidative environment, oils and proteins on our fingers. The sensor structure must also be resistant to chemical detergents and solvents, but be compatible with the underlying components of the sensor.

In one embodiment the present invention is directed to an integrated circuit passivation comprising, an integrated circuit, over which a first insulating layer is disposed. The first insulating layer helps to electrically isolate the integrated circuit from subsequent layer. Finally, a silicon carbide layer is disposed over the second insulating layer to provide hermetic and mechanical protection for the underlying circuit. The passivation may be any silicon-based layer having a hardness greater than of silicon nitride. One preferred use of a circuit for use with the present invention is a fingerprint sensor, which can be, e.g., a capacitively coupled fingerprint sensor.

In one embodiment the first insulating layer of the integrated circuit passivation can be a silicon oxide layer. Alternatively, the first insulating layer can be silicon nitride. The integrated circuit passivation may further comprise a second insulating layer disposed between the first insulating layer and the silicon carbide layer. The second insulating layer can be a silicon oxide or a silicon nitride. In yet another embodiment the first insulating layer is silicon oxide, and the second insulating layer is silicon nitride.

Yet another embodiment of the present invention is a method of fabricating a fingerprint sensor passivation comprising the steps of, obtaining an integrated circuit, depositing a first insulating layer on the integrated circuit and depositing over the first insulating layer a silicon carbide layer. The method may further comprising the step of depositing a second insulating layer between the first insulating layer and the silicon carbide layer.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

Figure 1:
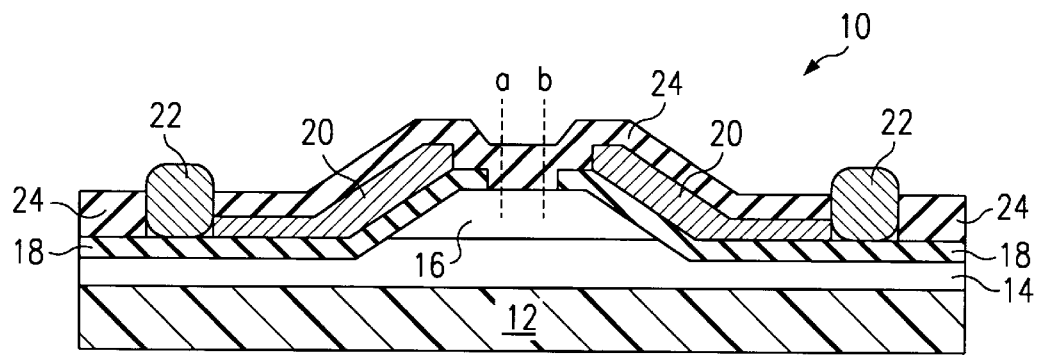
FIG. 1 is an illustrative cross section of an integrated circuit fingerprint sensor.

The general features of fingerprint sensor are shown in FIG. 1. An sensor 10, such as capacitively coupled fingerprint sensor, is formed on a silicon substrate 14 which may be placed on a backside support plastic laminate 12. Substrate 14 can have a conductivity type which is one of either a P-type conductivity or a N-type conductivity. Substrate 14 may be made of silicon, gallium arsenide, silicon on insulator (SOI) structures, epitaxial formations, germanium, germanium silicon, polysilicon, amorphous silicon, and/or like substrate, semi-conductive or conductive. The substrate 14 is typically made of single crystal silicon, and is usually lightly doped with boron, phosphorous or arsenic atoms.

A circuit 16 is formed over the substrate 16 and controls the reporting functions of the silicon sensor 10. An insulating layer 18 prevents conductivity between the circuit 16 and the metal layer 20. Solder bumps 22 electrically contact the metal layer 20 and are separated and positioned in place by the passivation 24.

The structure and method of the present invention can be used with a wide variety of fingerprint imaging sensors, such as the one described herein as an example, and as are well known to those skilled in the art. The fingerprint sensor 10 can have two metal plates that are placed next to the cell area and are separated from the surface of the finger by a passivation oxide or passivation 24. The surface of the skin acts as a third plate opposed the two metal plates or metal layers 20. This structure realizes a two-series connected capacitor circuit. The metal layers 20 can be separately connected to the input and output of a high-gain inverter (not shown) through the top surface of the solder balls 22 to creates a charge integrator.

The sensor 10 can work in two phases. First, the charge amplifier is reset, shorting the input and output of the inverter. During this phase, the output of the inverter settles to its logic threshold. In the second phase, a fixed amount of charge is sinked from the input causing an output voltage swing that is inversely proportional to the feedback capacitance value. Since the feedback capacitance is inversely proportional to the distance of the skin from the circuit 16, a linear dependence of output voltage depending on the skin distance can be provided.

For a fixed amount of sinked charge, the output voltage of the inverter will range between two extremes depending on the feedback capacitance value. One extreme is the upper saturation level which is attained if no feedback capacitance is present. The second extreme yields a value close to the logical threshold when the feedback capacitance is large, namely, when a capacitance due to the close proximity of a finger surface is present.

Using the above described capacitance-coupled sensor, resolutions of 390 dots per inch (dpi) can be achieved. With improvements in image processing algorithms, sensors having a resolution of 750 dpi can be expected. For use in sensing fingerprint valleys and ridges, an array of cells is used to sample the fingerprint pattern. The entire chip can also contain timing and voltage controls and references.

Figure 2:
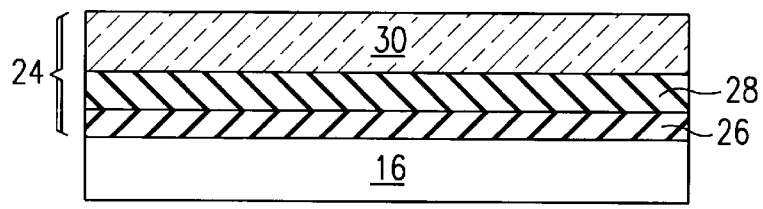
FIG. 2 is a cross-section of one embodiment of a structure for use with a fingerprint sensor.

The structure of the present invention, in one embodiment, is described in conjunction with FIG. 2 (generally a section taken between dotted lines and not showing any of the structure below circuit 16). Passivation 24 and its component layers are shown in cross-section over circuit 16. A silicon oxide layer 26 is disposed over circuit 16, which can be deposited using plasma enhanced deposition (PED). The thickness of the layer can be varied by, for example, changing the bias on the silicon wafer. Disposed over silicon oxide layer 26 is a silicon nitride layer 28, which can also be disposed by PED. Finally, a silicon carbide layer 30 is deposited by PED on the silicon nitride layer 28. Component layers silicon oxide layer 26, silicon nitride layer 28 and silicon carbide layer 30 make up the passivation 24 in this embodiment.

The silicon carbide layer 30 increases the durability of the silicon sensor, and more particularly, the passivation 24 without any significant effect on the sensitivity of the sensor 10. By using PED and a silicon-based layers, the adhesion between the layers is not a factor that may detrimentally affect device performance.

The silicon carbide layer 30 also has the advantage that it can be deposited using the same equipment that is presently used to create a fingerprint sensor. By using the current PED equipment the entire passivation 24 can be deposited at lower temperatures (300 degrees Celsius or less), and can be deposited on a heated pedestal. Also, the silicon carbide layer 30 is not necessarily a component of the sensor electronics, and can serve as a barrier layer.

Furthermore, during deposition the silicon carbide layer 30 does not generally diffuse into adjacent layers, and even if it did it would not affect device performance. Finally, when used in conjunction with a silicon nitride layer 28, the combined layers can serve as oxygen, mobile ion and moisture barriers, thereby protecting the underlying electronics. Silicon carbide is also very scratch resistance due to its coefficient of hardness.

Figure 3:
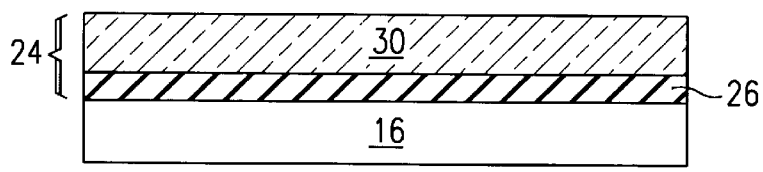
FIG. 3 is a cross-section of another embodiment of a structure for use with a fingerprint sensor.

Another embodiment is described in conjunction with FIG. 3. Like FIG. 2, in FIG. 3 the passivation 24 is shown in cross-section over circuit 16. A silicon oxide layer 26 is disposed over circuit 16 using, for example, PED. Disposed directly over the silicon oxide layer 26 is the silicon carbide layer 30.

Figure 4:
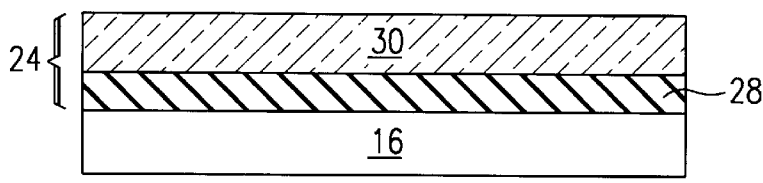
FIG. 4 is a cross-section of yet another embodiment of a structure for use with a fingerprint sensor.

An alternative embodiment of the invention is shown in FIG. 4 in which the passivation 24 comprises a silicon nitride layer 28 disposed over the circuit 16. Directly on the silicon nitride layer 28 is deposited the silicon carbide layer 30. This passivation 24 provides the necessary insulation and strength for protecting the circuit 16.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A mechanical protection layer for a finger contactable integrated circuit comprising:
    a fingerprint sensor having a surface;
    a silicon oxide insulating layer disposed over the sensor to electrically isolate the surface; and
    a silicon-based layer disposed over the silicon oxide insulating layer, the silicon-based layer having a hardness greater than silicon nitride to provide mechanical protection to the fingerprint sensor during contact with a finger.

2. The integrated circuit passivation of claim 1 wherein the silicon based layer is silicon carbide.

3. The integrated circuit passivation of claim 1, further comprising:
    a silicon nitride insulating layer disposed between the silicon oxide insulating layer and the silicon-based layer.

4. The integrated circuit passivation of claim 3 wherein the silicon-based layer is silicon carbide.

5. The integrated circuit passivation of claim 1 wherein said passivation is part of a fingerprint sensor.

6. A finger contactable mechanical protection layer for a fingerprint sensor comprising:
    a fingerprint sensor having a surface;
    a silicon oxide insulating layer disposed over the sensor to electrically isolate the sensor surface; and
    a finger contactable silicon carbide layer disposed over the silicon oxide insulating layer, wherein the silicon carbide layer provides mechanical protection and scratch resistance from contact during sensor use.

7. The integrated circuit passivation of claim 6, further comprising:
    a silicon nitride insulating layer disposed between the silicon oxide insulating layer and the silicon carbide layer.

8. The integrated circuit passivation of claim 6 wherein said passivation is part of a fingerprint sensor.

9. A method of fabricating a fingerprint sensor passivation comprising the steps of:
    forming an integrated circuit fingerprint sensor;
    depositing a silicon oxide insulating layer on the integrated circuit sensor; and
    depositing a silicon carbide layer over the silicon oxide insulating layer, wherein the silicon carbide layer protects the integrated circuit sensor from mechanical stress during contact.

10. The method of claim 9, further comprising:
    depositing a silicon nitride insulating layer between the silicon oxide insulating layer and the silicon carbide layer.

* * * * *